US011275255B2

(12) United States Patent
Jung et al.

(10) Patent No.: US 11,275,255 B2
(45) Date of Patent: Mar. 15, 2022

(54) INTEGRAL IMAGE PROCESSING DEVICE AND VEHICULAR LAMP USING SAME

(71) Applicant: LG INNOTEK CO., LTD., Seoul (KR)

(72) Inventors: Ji Young Jung, Seoul (KR); Sung Phil Kim, Seoul (KR); Yang Hyun Joo, Seoul (KR); Hyun Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 466 days.

(21) Appl. No.: 15/762,353

(22) PCT Filed: Sep. 26, 2016

(86) PCT No.: PCT/KR2016/010754
§ 371 (c)(1),
(2) Date: Mar. 22, 2018

(87) PCT Pub. No.: WO2017/052325
PCT Pub. Date: Mar. 30, 2017

(65) Prior Publication Data
US 2018/0239159 A1    Aug. 23, 2018

(30) Foreign Application Priority Data

Sep. 25, 2015  (KR) .................. 10-2015-0136821

(51) Int. Cl.
*G02B 30/27*      (2020.01)
*H04N 13/307*     (2018.01)
(Continued)

(52) U.S. Cl.
CPC .............. *G02B 30/27* (2020.01); *F21S 43/26* (2018.01); *H04N 13/275* (2018.05); *H04N 13/302* (2018.05); *H04N 13/307* (2018.05)

(58) Field of Classification Search
CPC ........ G02B 30/27; F21S 43/26; H04N 13/302; H04N 13/307; H04N 13/275
(Continued)

(56) References Cited

U.S. PATENT DOCUMENTS

2008/0036759 A1* 2/2008 Koike .................. G02B 30/00
                                                     345/419
2008/0252971 A1* 10/2008 Lee ...................... H04N 13/305
                                                      359/463
(Continued)

FOREIGN PATENT DOCUMENTS

CN          2609102 Y       3/2004
CN       102209254 A       10/2011
(Continued)

OTHER PUBLICATIONS

Supplementary European Search Report dated Aug. 23, 2018 in European Application No. 16849050.6.
(Continued)

*Primary Examiner* — Joseph G Ustaris
*Assistant Examiner* — Matthew David Kim
(74) *Attorney, Agent, or Firm* — Saliwanchik, Lloyd & Eisenschenk (57) ABSTRACT

According to embodiments, a display unit of an integral image processing device, which includes the display unit which reproduces all the elemental images of a 3D object as a 3D image, may include: a light source; and a reproducing lens array for integrating a plurality of individual elemental images, which are included in a patterned image that has patterned all elemental images and comprises all elemental images, and reproducing the individual elemental images as a 3D image.

18 Claims, 8 Drawing Sheets

(51) Int. Cl.
*F21S 43/20* (2018.01)
*H04N 13/302* (2018.01)
*H04N 13/275* (2018.01)

(58) Field of Classification Search
USPC .......................................................... 348/47
See application file for complete search history.

(56) References Cited

U.S. PATENT DOCUMENTS

| | | | |
|---|---|---|---|
| 2010/0123952 A1* | 5/2010 | Chen | G02B 30/27 359/464 |
| 2011/0254916 A1 | 10/2011 | Fan et al. | |
| 2012/0062991 A1* | 3/2012 | Krijn | H04N 13/351 359/463 |
| 2012/0075539 A1* | 3/2012 | Konishi | H04N 9/3161 349/5 |
| 2013/0182319 A1* | 7/2013 | Chung | G02B 30/27 359/463 |
| 2015/0177530 A1 | 6/2015 | Curtis et al. | |
| 2016/0099391 A1* | 4/2016 | An | H01L 33/507 257/88 |
| 2017/0153004 A1* | 6/2017 | De Zwart | F21V 3/0436 |

FOREIGN PATENT DOCUMENTS

| | | |
|---|---|---|
| CN | 103342060 A | 10/2013 |
| CN | 203442674 U | 2/2014 |
| CN | 104728722 A | 6/2015 |
| EP | 2 660 070 A1 | 11/2013 |
| JP | 2008-052010 A | 3/2008 |
| KR | 10-2008-0023302 A | 3/2008 |
| KR | 10-0910642 B1 | 8/2009 |
| KR | 10-2012-0090507 A | 8/2012 |
| KR | 10-2012-0093693 A | 8/2012 |
| KR | 20120090507 A * | 8/2012 |
| KR | 20120093693 A * | 8/2012 |
| KR | 10-2013-0055460 A | 5/2013 |
| KR | 10-2013-0106725 A | 9/2013 |
| KR | 10-1472921 B1 | 12/2014 |
| WO | WO-2012/144836 A2 | 10/2012 |

OTHER PUBLICATIONS

Office Action dated Nov. 4, 2019 in Chinese Application No. 201680055720.5.
International Search Report in International Application No. PCT/KR2016/010754, filed Sep. 26, 2016.
Office Action dated Dec. 9, 2021 in Korean Application No. 10-2015-0136821.

* cited by examiner

INTEGRAL IMAGE PROCESSING DEVICE AND VEHICULAR LAMP USING SAME

CROSS-REFERENCE TO RELATED APPLICATIONS

This application is the U.S. national stage application of International Patent Application No. PCT/KR2016/010754, filed Sep. 26, 2016, which claims priority to Korean Application No. 10-2015-0136821, filed Sep. 25, 2015, the disclosures of each of which are incorporated herein by reference in their entirety.

TECHNICAL FIELD

Embodiments relate to an integral image processing apparatus and a vehicle lamp using the same.

BACKGROUND ART

Recently, many studies on recognition of a 3-dimensional (3D) object and system implementation have been conducted.

Generally, a 3D stereoscopic image may be seen by a stereoscopic visual principle of the left eye and the right eye. Due to the difference between the two eyes, that is, due to the two eyes being separated by about 65 mm, the left eye and the right eye see slightly differently images. Thus, the difference between images caused by the difference in location between the two eyes is referred to as binocular disparity.

A stereoscopic image display apparatus uses such binocular disparity to cause the user's left eye to see only a left view image and the user's right eye to see only a right view image, so that the user feels binocular disparity and, as a result, the user feels stereoscopic perception. That is, the left and right eyes view different 2D images and the two images are transmitted to the brain through the retinas. The brain combines the images and feels depth perception (or stereoscopic perception) or reality perception. This technology is called stereography.

However, when the user sees a stereoscopic image using binocular disparity, the user may experience dizziness and eye fatigue due to the difference between two images and mismatch of a focusing function of the eyes. Therefore, substantial research into applying integral imaging techniques to solve problems of stereography has been conducted recently.

Integral imaging, proposed by Lippmann in 1908, has advantages of providing full parallax and successive observation perspectives like holographic technology which is 3D display technology. According to the integral imaging technology, glasses or other tools are not needed to see a stereoscopic image and a lens array consisting of a plurality of individual lenses is used to express a 3D stereoscopic image having a specific depth within a predetermined volume from all two-dimensional (2D) elemental images. That is, according to the integral imaging technology, the user may see a 3D stereoscopic image formed within a predetermined volume without eye fatigue and the user may feel as though they are seeing an actual 3D object.

A conventional integral image processing apparatus adopting the integral imaging technology includes a pickup unit and a display (or reproduction or restoration) unit.

The pickup unit stores various image information of a 3D object as an entire elemental image by use of a capture device such as a lens array or a camera. That is, the entire elemental image passing through the lens array of the pickup unit is stored in the pickup unit. The display unit may display the entire elemental image stored in the pickup unit on a display panel which is a type of a liquid crystal panel and image information of the entire elemental image passes through the lens array to display a 3D stereoscopic image (or an integrated image) in space. To this end, since the display unit necessarily includes a display panel, the conventional integral image processing apparatus has an increased volume.

DETAILED DESCRIPTION OF THE INVENTION

Technical Problems

An embodiment provides an integral image processing apparatus having small volume and a vehicle lamp using the same.

Technical Solutions

According to an embodiment, provided herein is an integral image processing apparatus including a display unit configured to reproduce an entire elemental image for a 3-dimensional (3D) object as a 3D image, wherein the display unit includes: a light source; and a reproduction lens array for integrating a plurality of individual elemental images, which are included in a patterned image obtained by patterning the entire elemental image and constitute the entire elemental image, and reproducing the individual elemental images as a stereoscopic image.

For example, the display unit may include a pattern of the patterned image and may further include a pattern film disposed between the light source and the reproduction lens array.

For example, the reproduction lens array may include a first plane facing the light source; and a second plane facing the reproduced stereoscopic image from the opposite side of the first plane.

For example, the pattern of the patterned image may be transferred to the first plane and then may be engraved on the first plane.

For example, the pattern of the patterned image may be engraved on the first plane of the reproduction lens array in the form of roughness or in the form of intaglio.

For example, the integral image processing apparatus may further include a pickup unit configured to generate the patterned image.

For example, the pickup unit may include a pickup lens array configured to cause a plurality of rays emitted from the 3D object to pass therethrough to generate the plural individual elemental images, and the entire elemental image consisting of the plural individual elemental images passing through the pickup lens array may be engraved on the pattern film as the pattern of the patterned image.

For example, the pickup lens array may have the same characteristics as the reproduction lens array.

For example, the pickup unit may model the 3D object, estimate an illuminance value of a pixel included in each of the plural individual elemental images after the modeled result passes through a pickup lens array, and generate data for an illuminance value with respect to coordinates of each pixel as the patterned image.

For example, a first separation distance between the pattern film and the reproduction lens array may be determined as follows according to a first resolution of the reproduced stereoscopic image:

$$g = R_I a \delta$$

where g denotes the first separation distance, $R_I$ denotes the first resolution, a denotes a second separation distance between the reproduction lens array and a center of the reproduced stereoscopic image, and δ denotes a size of a unit pixel of the patterned image.

For example, a first separation distance between the pattern film and a reproduction lens array and the second separation distance between the reproduction lens array and a center of the reproduced stereoscopic image may be determined as follows according to a first resolution of the reproduced stereoscopic image and a second resolution of the patterned image:

$$\frac{g}{a} = \frac{R_I}{R_D}$$

where $R_D$ denotes the second resolution.

For example, a view angle of the reproduced stereoscopic image may be determined as follows:

$$\tan\left(\frac{\psi}{2}\right) = \frac{p}{2g}$$

where ψ denotes the view angle and p denotes a size of a unit lens constituting the reproduction lens array.

For example, a depth of the reproduced stereoscopic image may be as follows:

$$\Delta z = 2\frac{a}{p}\delta_I$$

where Δz denotes the depth of the reproduced stereoscopic image and $\delta_I$ denotes a pixel size of the reproduced image.

For example, the pixel size of the reproduced image may be as follows:

$$\delta_I = \frac{a}{g}\delta$$

where $\delta_I$ denotes the pixel size of the reproduced image, g denotes a first separation distance between the pattern film and the reproduction lens array, a denotes the second separation distance between the reproduction lens array and the center of the reproduced stereoscopic image, and δ denotes the size of a unit pixel of the patterned image.

For example, a first resolution of the reproduced stereoscopic image may be inversely proportional to the pixel size of the reproduced image.

For example, a second resolution of the patterned image may be as follows:

$$R_D = R_I^2 \Delta z \tan\left(\frac{\psi}{2}\right)$$

where $R_D$ denotes the second resolution, $R_I$ denotes a first resolution of the reproduced stereoscopic image, Δz denotes a depth of the reproduced stereoscopic image, and ψ denotes a view angle of the reproduced stereoscopic image.

For example, the size of a unit lens constituting the reproduction lens array may be less than 1 mm to 2 mm or may be 5 mm to 10 mm. A unit lens constituting the reproduction lens array may include a fly-eye lens.

According to another embodiment, provided herein is a lamp used in a vehicle, including the integral image processing apparatus.

Advantageous Effects

According to the present invention, an integral image processing apparatus includes an entire picked-up elemental image in a pattern film or engraves a pattern of a patterned image on the back of a reproduction lens array, so that the volume of the integral image processing apparatus can be reduced. If the integral image processing apparatus is applied to a lamp of a vehicle such as a tail lamp, a stereoscopic image is provided to other vehicles behind the vehicle to provide high visibility and sophisticated design.

DESCRIPTION OF DRAWINGS

FIGS. 3a to 3d are views illustrating a patterned image and a stereoscopic image.

FIGS. 6A to 6C illustrate various shapes of a reproduction lens array illustrated in FIGS. 4 and 5.

BEST MODE FOR CARRYING OUT THE INVENTION

Hereinafter, embodiments of the present invention will be described in detail with reference to the attached drawings to aid in understanding of the present invention. However, embodiments according to the present invention can be modified in various ways and the scope of the present invention should not be interpreted as being limited to the following embodiments. Embodiments of the present invention are provided to fully describe the present invention to those having ordinary knowledge in the art to which the present invention pertains.

In description of the embodiments, it will be understood that, when an element is referred to as being formed "on" or "under" another element, it can be directly "on" or "under" the other element or be indirectly formed with intervening elements therebetween.

It will also be understood that, when an element is referred to as being "on" or "under," "under the element" as well as "on the element" can be included based on the element.

As used herein, relational terms, such as "on"/"upper part"/"above", "under"/"lower part"/"below," and the like, are used solely to distinguish one entity or element from another entity or element without necessarily requiring or implying any physical or logical relationship or order between such entities or elements.

Hereinafter, an integral image processing apparatus 100 according to an embodiment will be described with reference to the attached drawings. For convenience, the imaging processing apparatus 100 using the Cartesian coordinate system (x-axis, y-axis, and z-axis) is described. However, it is apparent that the image processing apparatus 100 can be described using other coordinate systems. Although the x-axis, the y-axis, and the x-axis are orthogonal according to the Cartesian coordinate system, embodiments are not limited thereto. In other words, the x-axis, the y-axis, and z-axis may not be orthogonal and may cross.

Figure 1:
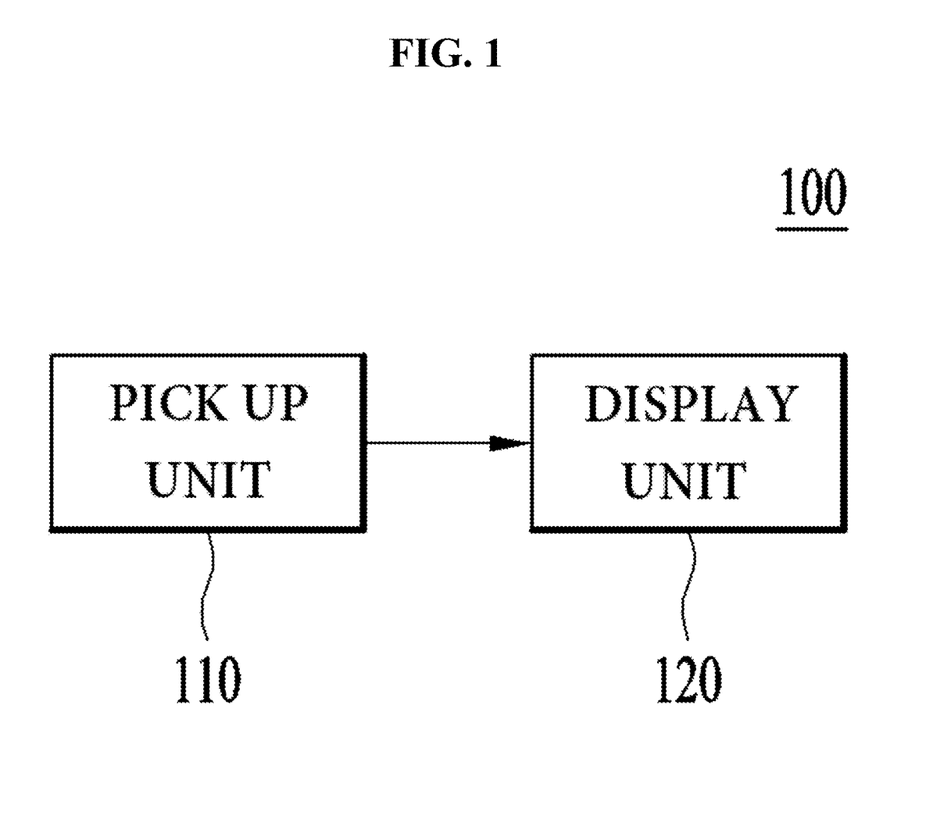
FIG. 1 is a block diagram of an integral image processing apparatus according to an embodiment.

FIG. 1 is a block diagram of the integral image processing apparatus 100 according to an embodiment. The integral image processing apparatus may include a pickup unit 110 and a display unit (or a reproduction unit) 120.

Referring to FIG. 1, the pickup unit 110 generates an entire elemental image for a 3D object OB and patterns the generated entire elemental image. Therefore, the patterned image generated from the pickup unit 110 is transmitted to the display unit 120 in various manners which will be described later. Herein, the entire elemental image may consist of a plurality of individual elemental images.

Hereinafter, an embodiment for generating the patterned image for the 3D object OB by the pickup unit 110 will be described.

Figure 2:
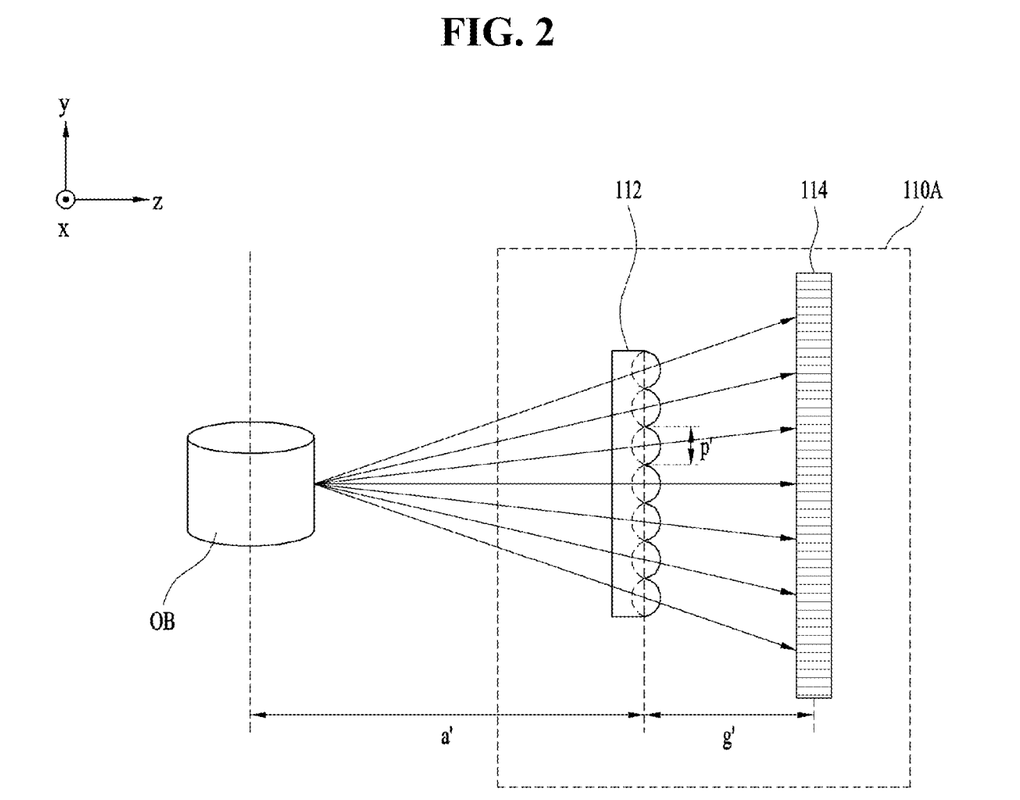
FIG. 2 is a view conceptually illustrating an embodiment of a pickup unit illustrated in FIG. 1.

FIG. 2 is a view conceptually illustrating an embodiment 110A of the pickup unit 110 illustrated in FIG. 1. Although FIG. 2 shows a 2D plane of the y-axis and the z-axis, a 3D object OB is represented as a perspective view to aid in understanding of the embodiment.

According to an embodiment, the pickup unit 110A may include a lens array (hereinafter, referred to as a "pickup lens array") 112 and a pattern film 114.

The pickup lens array 112 causes a plurality of rays generated from a 3D object (or an object) OB to pass therethrough.

To this end, the pickup lens array 112 may include a plurality of individual lenses. A plurality of individual elemental images of the 3D object OB seen from various directions in space is generated by the plural individual lenses. An individual elemental image is a 2D basic image for enabling a user to see the 3D object OB. The plural individual elemental images may have a uniform size.

Next, the entire elemental image consisting of a plurality of individual elemental images, each of which passes through each individual lens of the pickup lens array 112, may reach the pattern film 114 and may be engraved as a pattern of the patterned image. For example, the pattern film 114 may be polyethylene terephthalate (PET) but embodiments are not limited thereto.

In a general integral image processing apparatus, the pickup unit stores the entire elemental image in an imaging device. However, in the integral image processing apparatus according to an embodiment, the entire elemental image may be stored in the pattern film 114 in the form of a pattern (i.e., may be engraved). In this way, the patterned image for the 3D object OB may be physically generated.

According to another embodiment, the pickup unit 110 may model the 3D object OB and estimate an illuminance value of a pixel included in each of the plural individual elemental images after the modeled object passes through the pickup lens array, thereby generating data for the illuminance value with respect to coordinates of each pixel as the patterned image. For example, the entire elemental image may be generated by computer-generated integral imaging (CGII) using computer graphics. That is, the data for the illuminance value with respect to coordinates of the entire elemental image consisting of the plural individual elemental images for the 3D object OB may be generated as the patterned image by a computer algorithm. Thus, the patterned image for the 3D object OB may be programmatically generated.

According to a further embodiment, the patterned image may be generated in various ways without being limited to the above-described two embodiments. That is, the integral image processing apparatus 100 according to an embodiment may not include the pickup unit 110. In this case, a predefined patterned image may be provided to the display unit 120.

The entire elemental image may be a video image (or active image) for the 3D object OB or may be a still image. That is, according to an application of the integral image processing apparatus 100 of an embodiment, various still images may be generated as the patterned image.

Figure 3A:
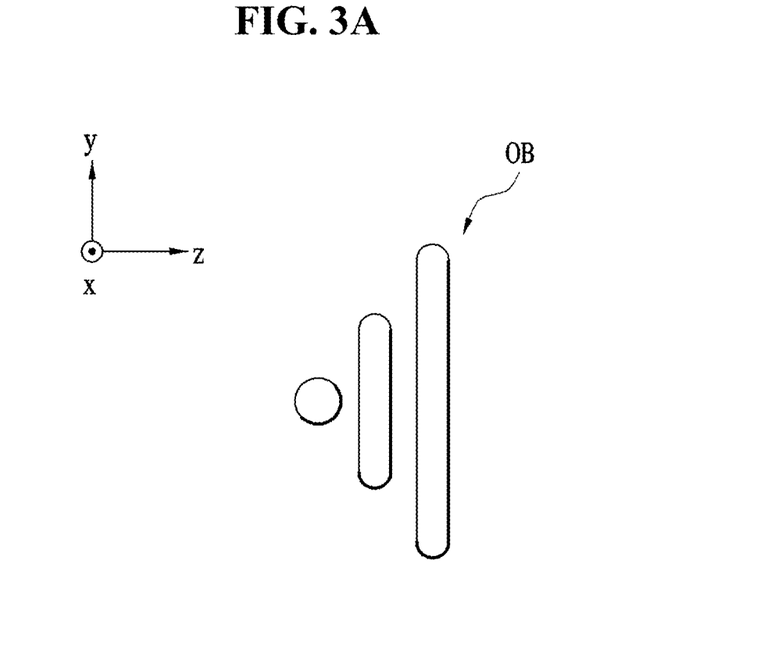
Figure 3B:
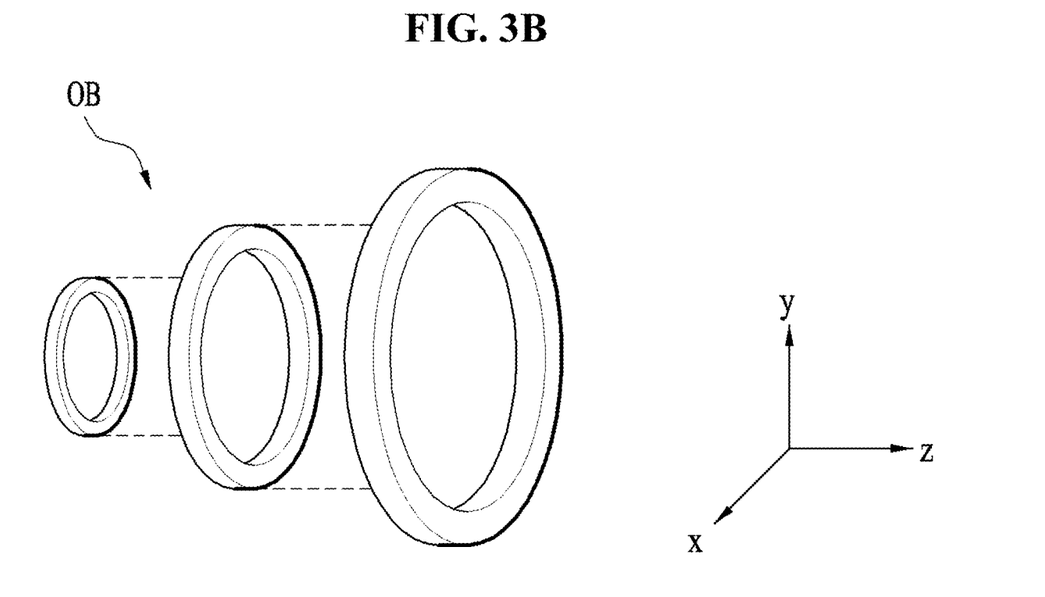
Figure 3C:
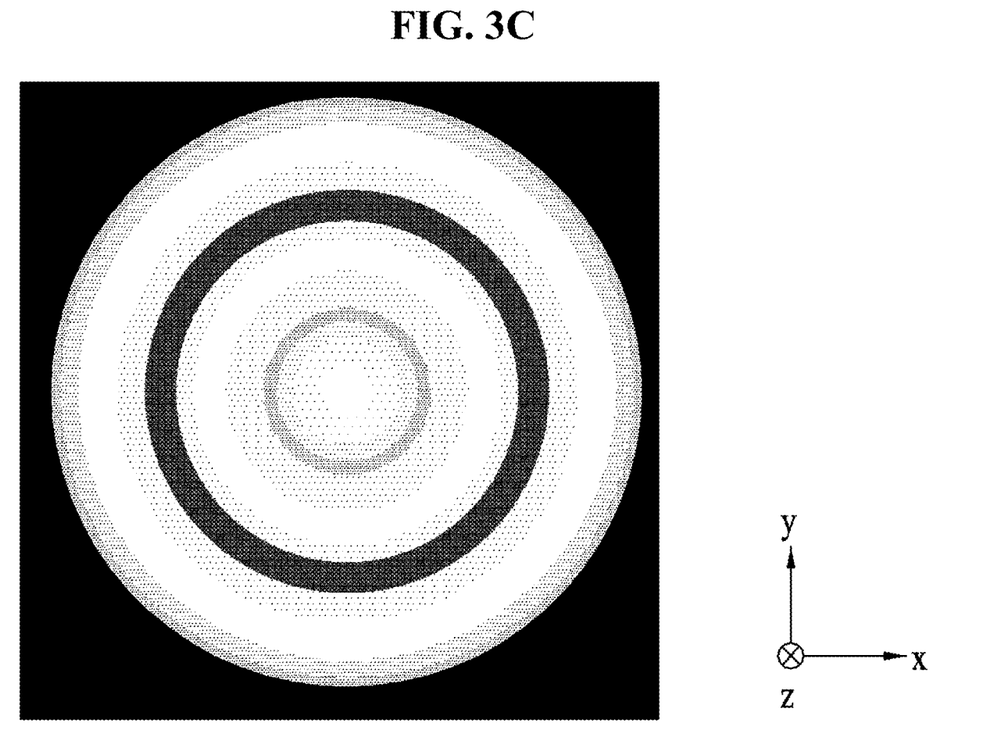

FIGS. 3a to 3d are views illustrating a patterned image and a stereoscopic image. FIG. 3a is a front view exemplarily illustrating a 3D object OB, FIG. 3b is a perspective view exemplarily illustrating the 3D object OB illustrated in FIG. 3a. FIG. 3c exemplarily illustrates a patterned image and FIG. 3d exemplarily illustrates a stereoscopic image.

In FIG. 2, although the 3D object OB has a cylindrical shape, embodiments are not limited thereto. For example, as illustrated in FIG. 3b, if the 3D object OB has the shape of three rings, the patterned image may have a shape illustrated in FIG. 3c.

As described above, a pattern of the patterned image illustrated in FIG. 3c may be engraved on the pattern film 114 or may be generated as data by a program.

Meanwhile, referring back to FIG. 1, the display unit 120 may reproduce the entire elemental image for the 3D object OB as a 3D image. That is, the display unit 120 may reproduce the 3D stereoscopic image from the patterned image generated from the pickup unit 110 illustrated in FIG. 1 or from a predefined patterned image. If the patterned image is as illustrated in FIG. 3c and the 3D object OB is as illustrated in FIGS. 3a and 3b, the stereoscopic image illustrated in FIG. 3d may be reproduced by the display unit 120.

Figure 4:
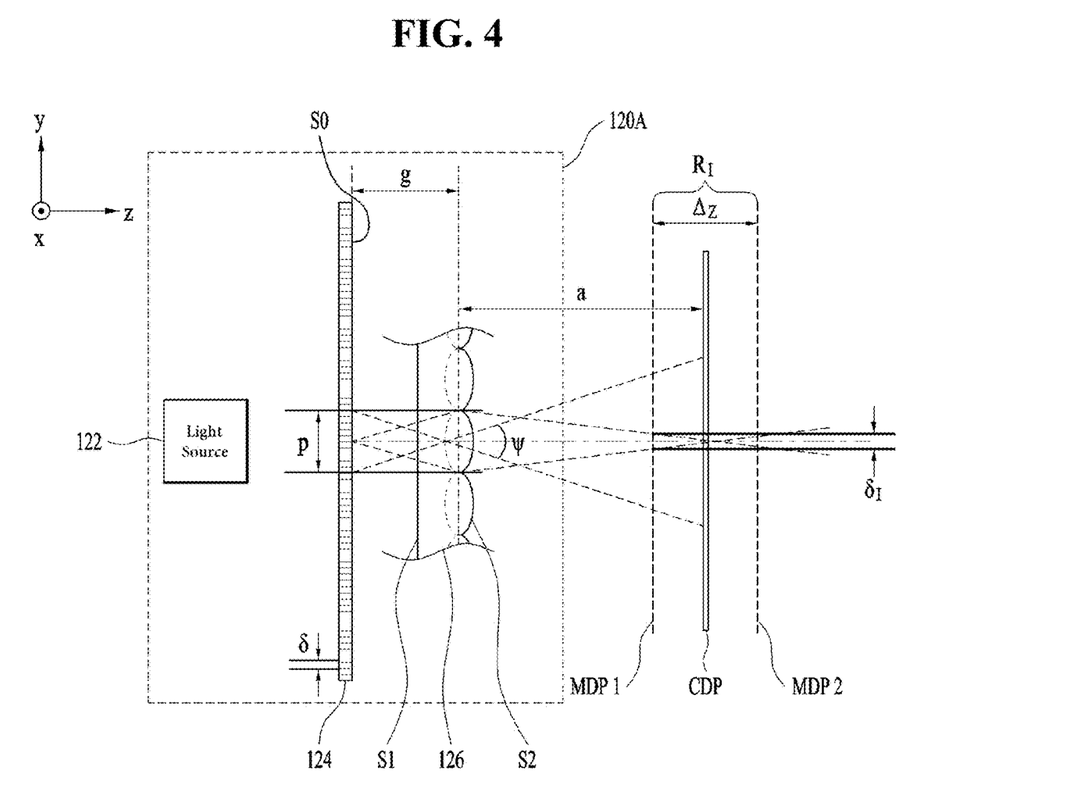
FIG. 4 is a view conceptually illustrating an embodiment of a display unit illustrated in FIG. 1.

FIG. 4 is a view conceptually illustrating an embodiment 120A of the display unit 120 illustrated in FIG. 1.

According to an embodiment, as illustrated in FIG. 4, the display unit 120A may include a light source 122, a pattern film 124, and a lens array (hereinafter, referred to as a "reproduction lens array") 126.

The light source 122 emits light towards the pattern film 124. The light source 122 may emit scattered light but embodiments are not limited to the types of light emitted from the light source 122. For example, a backlight unit (BLU) may be used as the light source 122 but embodiments are not limited to the types of light source 122.

The pattern film 124 illustrated in FIG. 4 may be the pattern film 114 illustrated in FIG. 2. As described above with reference to FIG. 2, if the entire elemental image for the 3D object OB is patterned and a pattern of the patterned image is engraved on the pattern film 114, the pattern film 114 may be used in the display unit 120A. The pattern film 124 illustrated in FIG. 4 may be disposed between the light source 122 and the reproduction lens array 126 but embodiments are not limited thereto.

In addition, a plurality of individual elemental images included in the patterned image may be integrated so as to be reproduced as a stereoscopic image RI. That is, individual elemental images of the 3D object OB constituting the entire elemental image included in the patterned image are integrated while passing through the reproduction lens array 126, thereby being reproduced as the stereoscopic image. To this end, light may be emitted from the light source 122.

If the pattern of the patterned image is engraved in the pattern film 114 as illustrated in FIG. 2, the reproduction lens array 126 illustrated in FIG. 4 and the pickup lens array 112 illustrated in FIG. 2 may have the same characteristics. For example, the pickup and reproduction lens arrays 112 and 126 illustrated respectively in FIGS. 2 and 4 may have the following similar characteristics.

A first separation distance g between the pattern film 124 and the reproduction lens array 126 illustrated in FIG. 4 may be equal to a separation distance g' between the pickup lens array 112 and the pattern film 114 illustrated in FIG. 2. Herein, the first separation distance g may correspond to a separation distance to the lens array 126 from an outer plane SO of the pattern film 124 facing the reproduction lens array 126.

A second separation distance a between the reproduction lens array 126 illustrated in FIG. 4 and a center depth plane (CDP) (or a reference depth plane) of a reproduced stereoscopic image RI may be equal to a separation distance a' between the 3D object OB and the pickup lens array 112 illustrated in FIG. 2.

The first separation distance g illustrated in FIG. 4 may be determined as indicated by Equation 1 according to a resolution $R_I$ of the reproduced stereoscopic image RI.

$$g = R_I a \delta \quad \text{[Equation 1]}$$

Herein, referring to FIG. 4, $\delta$ denotes the size of a unit pixel of a patterned image having a pattern engraved on the pattern film 124.

The first separation distance g and the second separation distance a illustrated in FIG. 4 may be determined as indicated by Equation 2 according to the first resolution $R_I$ of the reproduced stereoscopic image and a second resolution $R_D$ of a patterned image having a pattern engraved on the pattern film 124.

$$\frac{g}{a} = \frac{R_I}{R_D} \quad \text{[Equation 2]}$$

Referring to Equations 1 and 2, it can be appreciated that the second resolution $R_D$ is determined by Equation 3.

$$R_D = \frac{1}{\delta} \quad \text{[Equation 3]}$$

Referring to Equation 2, it can be appreciated that, when the second resolution $R_D$ is fixed, the first resolution $R_I$ is adjusted by adjusting the first and second separation distances g and a.

The number of lenses included in the reproduction lens array 126 illustrated in FIG. 4 may be equal to the number of lenses included in the pickup lens array 112 illustrated in FIG. 2.

A unit lens constituting each of the reproduction lens array 126 illustrated in FIG. 4 and the pickup lens array 112 illustrated in FIG. 2 may be a fly-eye lens but embodiments are not limited to the types of the unit lens.

A size p of a unit lens included in the reproduction lens array 126 illustrated in FIG. 4 may be equal to a size p' of a unit lens included in the pickup lens array 112 included in FIG. 2. For example, if the stereoscopic perception (or depth perception) of the reproduced stereoscopic image RI has priority over the first resolution $R_I$ of the reproduced stereoscopic image RI, the size p of each unit lens constituting the reproduction lens array 126 may be 2 mm or less but embodiments are not limited thereto.

Alternatively, if the first resolution $R_I$ of the reproduced stereoscopic image RI has priority over the stereoscopic perception of the reproduced stereoscopic image RI, the size p of each unit lens constituting the reproduction lens array 126 may be 5 mm or more but embodiments are not limited thereto.

If the integral image processing apparatus according to this embodiment is applied to a vehicle tail lamp which will be described with reference to FIG. 8, the height of an individual integral image processing apparatus may be limited to a maximum of 15 mm although it may be different according to the construction of the tail lamp. In this case, if the size p of each unit lens is less than 1 mm, a view angle is remarkably reduced to 15 degrees or less and, if the size p of each unit lens is greater than 10 mm, it is difficult to secure the depth perception of 30 mm or more. Accordingly, if stereoscopic perception takes priority over the first resolution, the size of the unit lens may have a range of 1 mm to 2 mm and, if the first resolution takes priority over the stereoscopic perception, the size of the unit lens may have a range of 5 mm to 10 mm. However, embodiments are not limited thereto.

A view angle $\psi$ of the reproduced stereoscopic image RI may be determined as indicated by Equation 4.

$$\tan\left(\frac{\psi}{2}\right) = \frac{p}{2g} \quad \text{[Equation 4]}$$

Herein, referring to Equation 4, it can be appreciated that the view angle $\psi$ can be adjusted according to the size p of the unit lens included in the reproduction lens array 126 and the first separation distance g.

A depth $\Delta z$ of the reproduced image RI may be determined as indicated by Equation 5.

$$\Delta z = 2\frac{a}{p}\delta_I \quad \text{[Equation 5]}$$

Herein, $\delta_I$ denotes a pixel size of the reproduced stereoscopic image RI and may be represented by Equation 6.

$$\delta_I = \frac{a}{g}\delta \quad \text{[Equation 6]}$$

Referring to Equations 3, 5, and 6, it can be appreciated that the depth $\Delta z$ of the reproduced image can be adjusted by adjusting the size p of the unit lens and the first and second separation distances g and a in a state in which the second resolution $R_D$ is fixed.

If Equation 7 indicated below is substituted into Equation 5 and Equations 2 and 4 are applied, the second resolution $R_D$ may be expressed as indicated by Equation 8.

$$R_I = \frac{1}{\delta_I} \qquad \text{[Equation 7]}$$

$$R_D = R_I^2 \Delta z \tan\left(\frac{\psi}{2}\right) \qquad \text{[Equation 8]}$$

Referring to FIG. 4, the depth Δz of the reproduced image RI may be defined by a first marginal depth plane MDP1 and a second marginal depth plane MDP2. Therefore, the depth Δz of the reproduced image RI expressed as indicated by Equation 5 may be an interval between the first marginal depth plane MDP1 and the second marginal depth plane MDP2 in the z-axis direction. As the depth Δz of the reproduced image RI increases, the stereoscopic sense of the reproduced image RI may also increase.

In addition, "a CDP of a stereoscopic image RI" which is mentioned when defining the second separation distance a may be any one point on a CDP located at the middle between the first marginal depth plane MDP1 and the second marginal depth plane MDP2.

Figure 5:
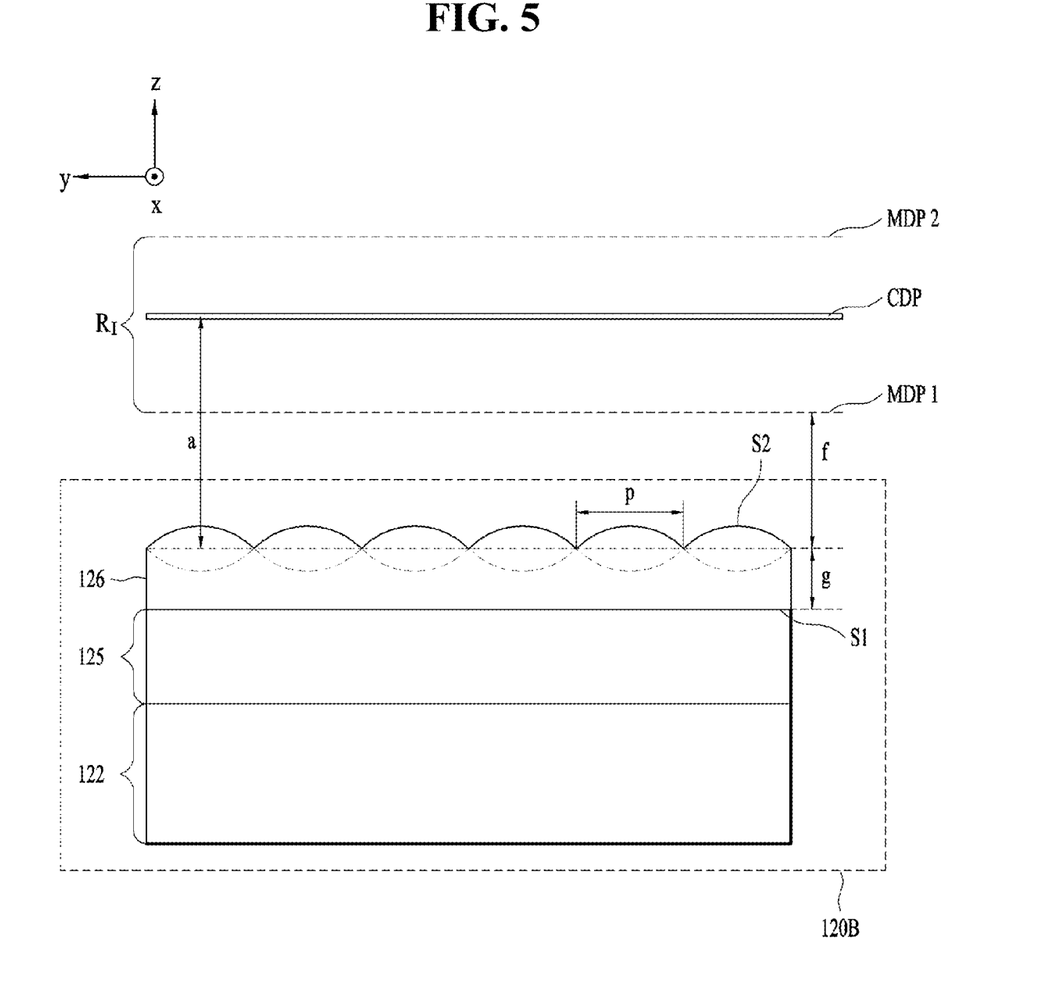
FIG. 5 is a view conceptually illustrating another embodiment of the display unit illustrated in FIG. 1.

FIG. 5 is a view conceptually illustrating another embodiment 120B of the display unit 120 illustrated in FIG. 1.

According to another embodiment, the display unit 120B may include a light source 122 and a reproduction lens array 126 as illustrated in FIG. 5

Referring to FIG. 5, the reproduction lens array 126 may include a first plane S1 and a second plane S2. The first plane S1 corresponds to the back surface of the reproduction lens array 126 facing the light source 122 and the second plane S2 corresponds to the front surface of the reproduction lens array 126 facing a reproduced stereoscopic image RI from the opposite side of the first plane S1.

The display unit 120B illustrated in FIG. 5 according to another embodiment does not include the pattern film 124. In this case, a pattern 125 of a patterned image corresponding to an entire elemental image for a 3D object OB may be transferred and engraved on the first plane S1 of the reproduction lens array 126. In this way, except that the pattern 125 of the patterned image is transferred on the first plane S1 of the reproduction lens array 126 instead of being engraved on the pattern film 124, since the display unit 120B illustrated FIG. 5 is the same as the display unit 120A illustrated in FIG. 4, a repetitive description will be omitted.

Figure 6A:
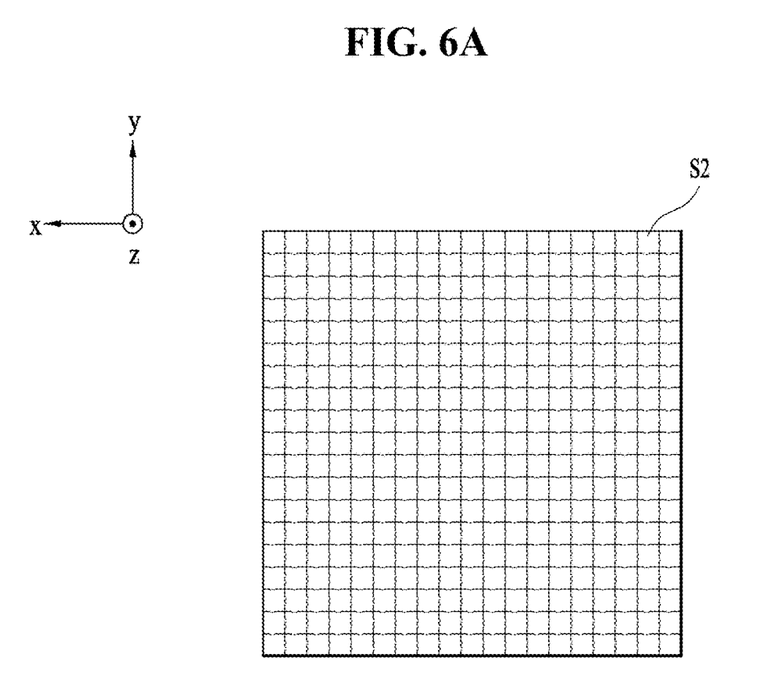
Figure 6B:
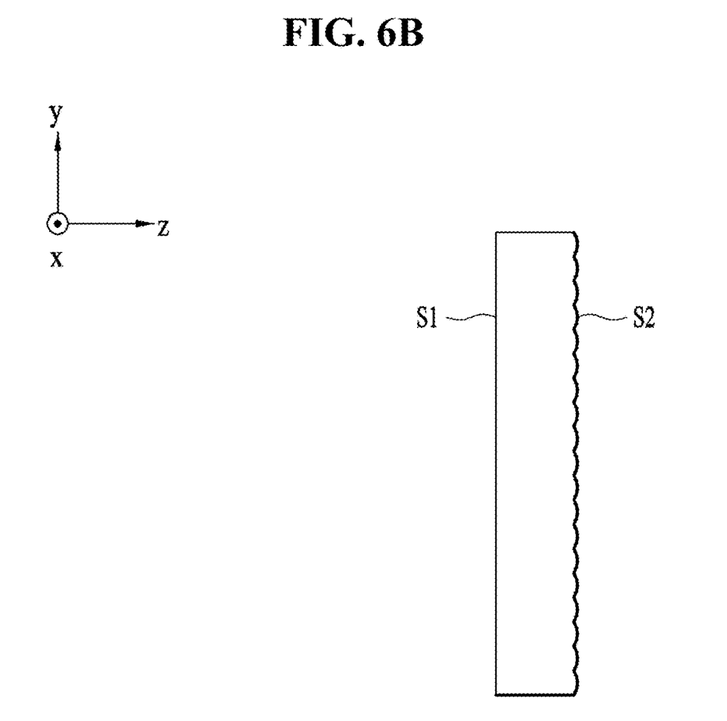
Figure 6C:
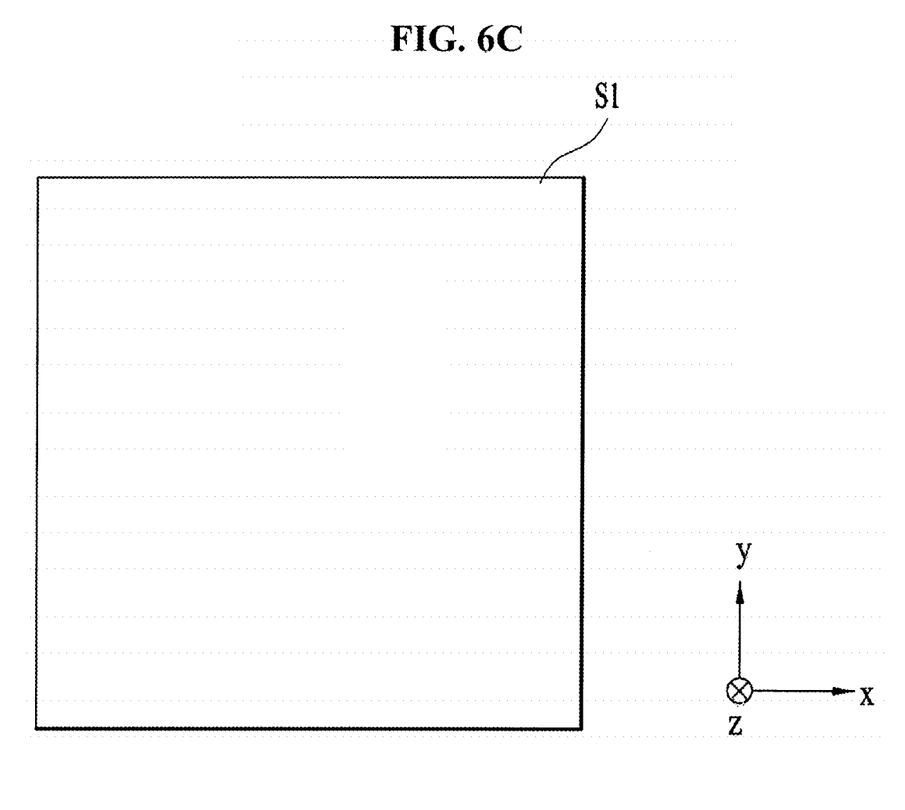

FIGS. 6A to 6C illustrate various shapes of the reproduction lens array 126 illustrated in FIGS. 4 and 5. Based on the reproduction lens array 126 illustrated in FIGS. 4 and 5, FIG. 6A is a right side view of the reproduction lens array 126, FIG. 6B is a front view of the reproduction lens array 126, and FIG. 6C is a left side view of the reproduction lens array 126.

Figure 7:
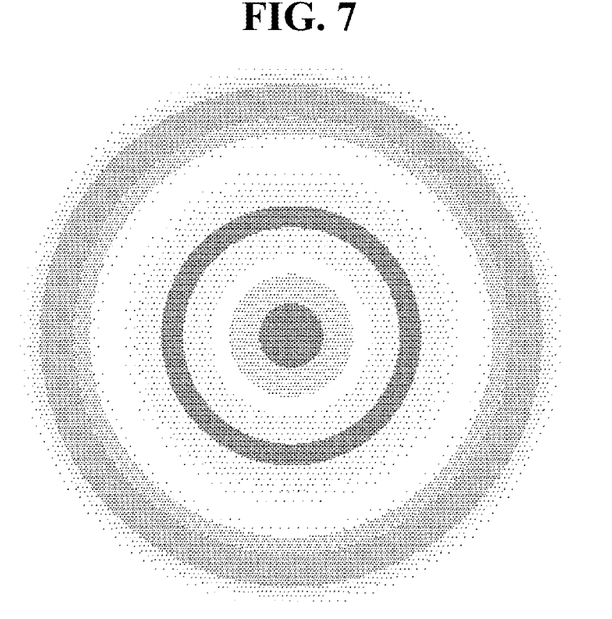
FIG. 7 exemplarily illustrates a pattern of a patterned image transferred on a reproduction lens array.

FIG. 7 exemplarily illustrates a pattern of a patterned image transferred on the reproduction lens array 126.

If the patterned image for the 3D object illustrated in FIGS. 3a and 3b is given as illustrated in FIG. 3c, the pattern of the patterned image as illustrated in FIG. 7 may be engraved on the first plane S1 of the reproduction lens array 126 illustrated in FIG. 6c.

According to an embodiment, the pattern of the patterned image may be engraved on the first plane S1 of the reproduction lens array 126 in the form of roughness or intaglio.

Although the light source 122 is disposed in contact with the pattern 125 of the patterned image engraved on the first plane S1 of the reproduction lens array 126 as illustrated in FIG. 5, embodiments are not limited thereto. That is, according to another embodiment, the light source 122 may be disposed separately from the pattern 125 of the patterned image in the z-axis direction.

As described above, in the display unit 120A illustrated in FIG. 2, the pattern of the patterned image is engraved on the pattern film 124, whereas, in the display unit 120B illustrated in FIG. 4, the pattern 125 of the patterned image is engraved on the first plane S1 of the reproduction lens array 126.

Meanwhile, according to an embodiment, the first separation distance g, the second separation distance a, the view angle ψ, a maximum value max(Δz) of the depth of the reproduced image, and the pixel size $\delta_1$ of the reproduced image RI may have various values as shown in Table 1 according to the above-described equations.

TABLE 1

| Classification | g (mm) | a (mm) | ψ (°) | max (Δz) (mm) | $\delta_I$ (mm) | Description |
|---|---|---|---|---|---|---|
| CASE 1 | 11 | 110 | 25.6 | 132 | 3 | f = 10 |
|  | 14 | 35 | 20.2 | 10.5 | 0.75 | p = 5 |
|  | 20 | 20 | 14.3 | 2.4 | 0.3 | δ = 0.3 |
| CASE 2 | 11 | 110 | 48.9 | 66 | 3 | f = 10 |
|  | 14 | 35 | 39.3 | 5.25 | 0.75 | p = 10 |
|  | 20 | 20 | 28 | 1.2 | 0.3 | δ = 0.3 |
| CASE 3 | 6 | 30 | 45.2 | 18 | 1.5 | f = 5 |
|  | 8 | 13.3 | 34.7 | 2.7 | 0.5 | p = 5 |
|  | 10 | 10 | 28 | 1.2 | 0.3 | δ = 0.3 |
| CASE 4 | 11 | 110 | 25.6 | 440 | 10 | f = 10 |
|  | 14 | 35 | 20.2 | 35 | 2.5 | p = 5 |
|  | 20 | 20 | 14.3 | 8 | 1 | δ = 1 |

Referring to Table 1, if the size p of each of a plurality of unit lenses constituting the reproduction lens array 126 is increased from 5 mm of CASE 1 to 10 mm of CASE 2, it can be appreciated that the view angle ψ becomes wider but the stereoscopic sense (max(Δz)) of the reproduced image RI is lowered.

In addition, if a focus distance f of the reproduction lens array 126 is decreased from 10 mm of CASE 1 to 5 mm of CASE 3, it can be appreciated that the view angle ψ is increased, similar to CASE 2, and the stereoscopic sense (max(Δz)) is lower than that of CASE 2 but a width g in the z-axis direction of the display unit 120 becomes thinner. Herein, the focus distance f has a relationship indicated in Equation 9.

$$\frac{1}{a} + \frac{1}{g} = \frac{1}{f} \qquad \text{[Equation 9]}$$

If the size δ of a pixel included in a patterned image is increased from 0.3 mm of CASE 1 to 1 mm of CASE 4, it can be appreciated that the view angle ψ is the same as that of CASE 1 and the stereoscopic perception (max(Δz)) is increased above CASE 1, 2, or 3.

As described with reference to Table 1, it can be appreciated that the view angle ψ and the stereoscopic perception (max(Δz)) can be adjusted by adjusting the focus distance f of the reproduction lens array 126, the size p of each of a plurality of unit lenses, and the size δ of a pixel included in an image pattern. Accordingly, the view angle ψ and the stereoscopic perception (max(Δz)) can be satisfied in fields to which the above-described integral image processing apparatus 100 is applied by adjusting the focus distance f of the reproduction lens array 126, the size p of each of a plurality of unit lenses, and the size δ of a pixel included in a patterned image.

The integral image processing apparatus according to the above-described embodiment may be applied to various fields. Accordingly, if the integral image processing apparatus 100 includes only the display unit 120, 120A, or 120B without including the pickup unit 110, the display unit 120, 120A, or 120B may be applied to various fields. For example, the display units 120, 120A, and 120B may be used for vehicle lamps such as a tail lamp, a position lamp, and a brake lamp.

Figure 8:
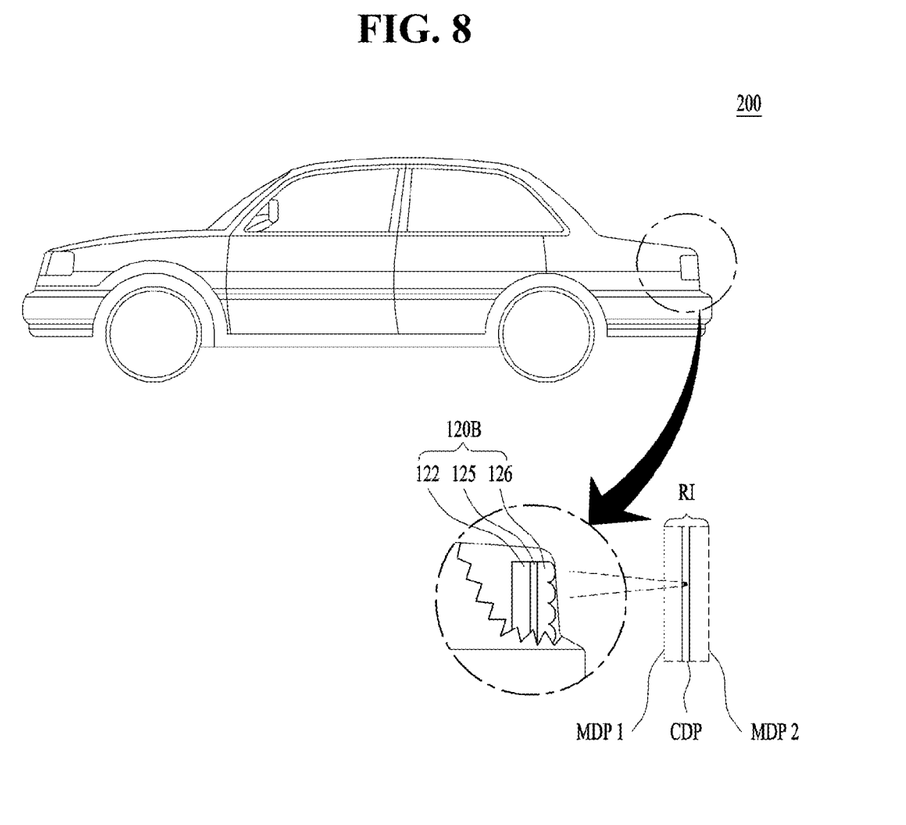
FIG. 8 is a view illustrating an example applied to an integral image processing apparatus according to an embodiment.

FIG. 8 is a view illustrating an example applied to the integral image processing apparatus 100 according to an embodiment.

The display unit 120B of the integral image processing apparatus 100 illustrated in FIG. 5 according to the above-described embodiment may be applied to a tail lamp of a vehicle 200 as illustrated in FIG. 8. Although not illustrated, the display unit 120A illustrated in FIG. 4, instead of the display unit 120B illustrated in FIG. 5, may be applied to the tail lamp of the vehicle 200.

Figure 3D:
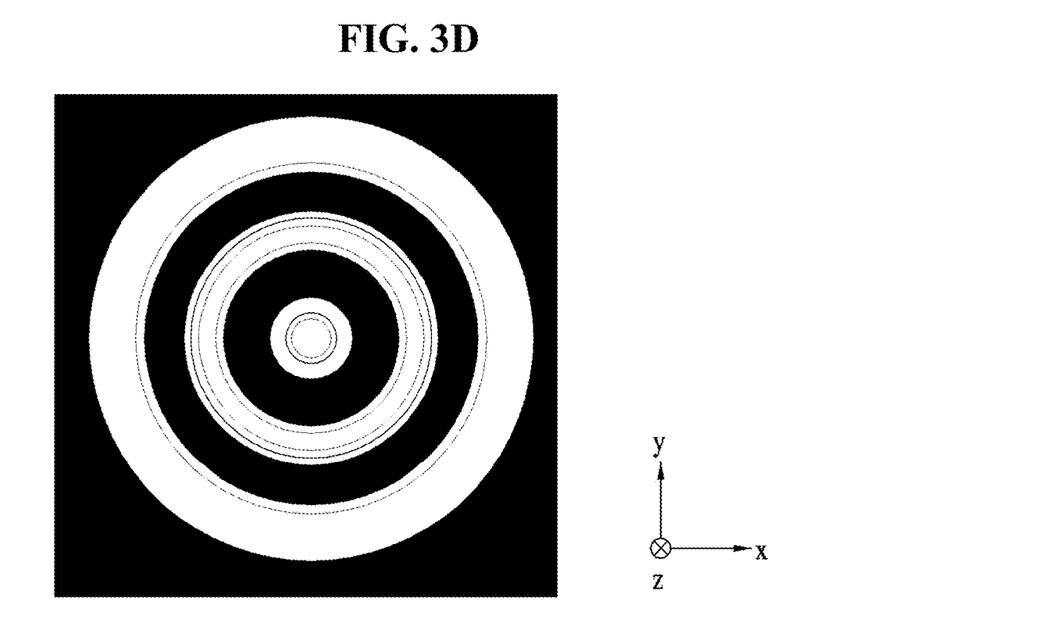

In this case, the stereoscopic image RI may be reproduced as illustrated in FIG. 3*d* even in a space separated from the tail of the vehicle 200.

If the integral image processing apparatus 100 according to the above-described embodiment is applied to a tail lamp of the vehicle as illustrated in FIG. 8, high visibility can be provided by providing a stereoscopic image to other vehicles behind the vehicle 200 and a sophisticated design can be provided.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

The integral image processing apparatus according to an embodiment includes an entire picked-up elemental image in a pattern film or a pattern of a patterned image is engraved on the back of the reproduction lens array so that the volume of the integral image processing apparatus can be reduced because a display panel is not needed in the display panel. If the integral image processing apparatus is applied to a tail lamp of a vehicle, high visibility can be provided by providing a stereoscopic image to other vehicles behind the vehicle and a sophisticated design can be provided.

The invention claimed is:

1. An integral image processing apparatus comprising a display unit configured to reproduce an entire elemental image for a 3-dimensional (3D) object as a 3D image, the display unit comprising:
a light source;
a reproduction lens array comprising a first surface being planar and facing the light source and a second surface having a plurality of curvatures opposite to the first surface and having a positive focal length; and
a pattern layer receiving light from the light source and generating a patterned image, being disposed between the light source and the reproduction lens array and comprising a top surface in direct contact with the first surface of the reproduction lens array and a bottom surface in direct contact with the light source;
wherein the reproduction lens array integrating a plurality of individual elemental images, which are included in the patterned image obtained by patterning the entire elemental image and constituting the entire elemental image, and reproducing the individual elemental images as a stereoscopic image to which the second surface of the reproduction lens array faces, and the patterned image being transferred to the first surface and engraved on the first surface; and
wherein the display unit is configured to display a pattern of the patterned image.

2. The integral image processing apparatus according to claim 1, wherein the display unit comprises a pattern film disposed between the light source and the reproduction lens array.

3. The integral image processing apparatus according to claim 1, wherein the pattern of the patterned image is engraved on the first surface of the reproduction lens array in a form of roughness.

4. The integral image processing apparatus according to claim 1, wherein the pattern of the patterned image is engraved on the first surface of the reproduction lens array in a form of intaglio.

5. The integral image processing apparatus according to claim 2, comprising a pickup unit comprising an image capture device and configured to generate the patterned image.

6. The integral image processing apparatus according to claim 5, wherein the pickup unit includes a pickup lens array configured to cause a plurality of rays emitted from the 3D object to pass therethrough to generate the plurality of individual elemental images, and the entire elemental image comprising the plurality of individual elemental images passing through the pickup lens array is engraved on the pattern film as the pattern of the patterned image.

7. The integral image processing apparatus according to claim 6, wherein the pickup lens array has same characteristics as these of the reproduction lens array.

8. The integral image processing apparatus according to claim 5, wherein the pickup unit models the 3D object, estimates an illuminance value of a pixel included in each of the plurality of individual elemental images after the modeled result passes through a pickup lens array, and generates data for the illuminance value with respect to coordinates of each pixel as the patterned image.

9. The integral image processing apparatus according to claim 2, wherein a first separation distance between the pattern film and the reproduction lens array is determined as follows according to a first resolution of the reproduced stereoscopic image:

$$g = R_I a \delta$$

(where g denotes the first separation distance, $R_I$ denotes the first resolution, a denotes a second separation distance between the reproduction lens array and a center of the reproduced stereoscopic image, and denotes a size of a unit pixel of the patterned image).

10. The integral image processing apparatus according to claim 2, wherein a first separation distance between the pattern film and the reproduction lens array and a second separation distance between the reproduction lens array and a center of the reproduced stereoscopic image are determined as follows according to a first resolution of the reproduced stereoscopic image and a second resolution of the patterned image:

$$\frac{g}{a} = \frac{R_I}{R_D}$$

(where g denotes the first separation distance, a denotes the second separation distance, $R_I$ denotes the first resolution, and $R_D$ denotes the second resolution).

11. The integral image processing apparatus according to claim 2, wherein a view angle of the reproduced stereoscopic image is determined as follows:

$$\tan\left(\frac{\psi}{2}\right) = \frac{p}{2g}$$

(where ψ denotes the view angle, p denotes a size of a unit lens constituting the reproduction lens array, and g denotes a first separation distance between the patterned image and the reproduction lens array).

12. The integral image processing apparatus according to claim 2, wherein a depth of the reproduced stereoscopic image is defined by:

$$\Delta z = 2\frac{a}{p}\delta_I$$

(where Δz denotes the depth of the reproduced stereoscopic image, a denotes a second separation distance between the reproduction lens array and a center of the reproduced stereoscopic image, p denotes a size of a unit lens constituting the reproduction lens array, and $\delta_I$ denotes a pixel size of the reproduced image).

13. The integral image processing apparatus according to claim 12, wherein the pixel size of the reproduced image is defined as:

$$\delta_I = \frac{a}{g}\delta$$

(where $\delta_I$ denotes the pixel size of the reproduced image, g denotes a first separation distance between the pattern film and the reproduction lens array, a denotes the second separation distance between the reproduction lens array and the center of the reproduced stereoscopic image, and δ denotes the size of a unit pixel of the patterned image).

14. The integral image processing apparatus according to claim 12, wherein a first resolution of the reproduced stereoscopic image is inversely proportional to the pixel size of the reproduced image.

15. The integral image processing apparatus according to claim 2, wherein a second resolution of the patterned image is defined as:

$$R_D = R_I^2 \Delta z \tan\left(\frac{\psi}{2}\right)$$

(where $R_D$ denotes the second resolution, $R_I$ denotes a first resolution of the reproduced stereoscopic image, Δz denotes a depth of the reproduced stereoscopic image, and ψ denotes a view angle of the reproduced stereoscopic image).

16. The integral image processing apparatus according to claim 1, wherein the size of a unit lens constituting the reproduction lens array is in a range of 1 mm to 2 mm or is in a range of 5 mm to 10 mm.

17. The integral image processing apparatus according to claim 1, wherein a unit lens constituting the reproduction lens array includes a fly-eye lens.

18. A lamp used in a vehicle, comprising the integral image processing apparatus of claim 1.

* * * * *